(12) United States Patent
Stuehrenberg et al.

(10) Patent No.: US 7,850,123 B2
(45) Date of Patent: Dec. 14, 2010

(54) METHODS AND APPARATUS FOR A CABLE RETRACTOR

(75) Inventors: Justin C. Stuehrenberg, Indianapolis, IN (US); Ronaldo A. Bajuyo, Indianapolis, IN (US); Armando Guerrero, Columbus, IN (US); Benjamin J. Galanti, Carmel, IN (US); David G. Howard, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 1095 days.

(21) Appl. No.: 11/530,180

(22) Filed: Sep. 8, 2006

(65) Prior Publication Data

US 2008/0078882 A1    Apr. 3, 2008

(51) Int. Cl.
*B64D 1/12* (2006.01)

(52) U.S. Cl. .................... 244/137.4; 89/1.54
(58) Field of Classification Search .......... None
See application file for complete search history.

(56) References Cited

U.S. PATENT DOCUMENTS

| 3,667,342 | A | * | 6/1972 | Warnock et al. | 89/1.55 |
| 4,167,887 | A | * | 9/1979 | Magro | 89/1.55 |
| 4,478,127 | A | * | 10/1984 | Hennings et al. | 89/1.55 |
| 4,487,102 | A | * | 12/1984 | Fritz | 89/1.55 |
| 4,882,970 | A | * | 11/1989 | Kovar | 89/1.55 |
| 5,904,323 | A | * | 5/1999 | Jakubowski et al. | 244/137.4 |
| 7,637,460 | B2 | * | 12/2009 | Stuehrenberg | 244/137.4 |

* cited by examiner

*Primary Examiner*—Tien Dinh
(74) *Attorney, Agent, or Firm*—Daly, Crowley, Mofford & Durkee, LLP

(57) ABSTRACT

Methods and apparatus for a cable retractor to facilitate removal of a cable connector from an item after release from a vehicle. In one embodiment, the cable retractor pulls in the connector after the item is released.

27 Claims, 22 Drawing Sheets

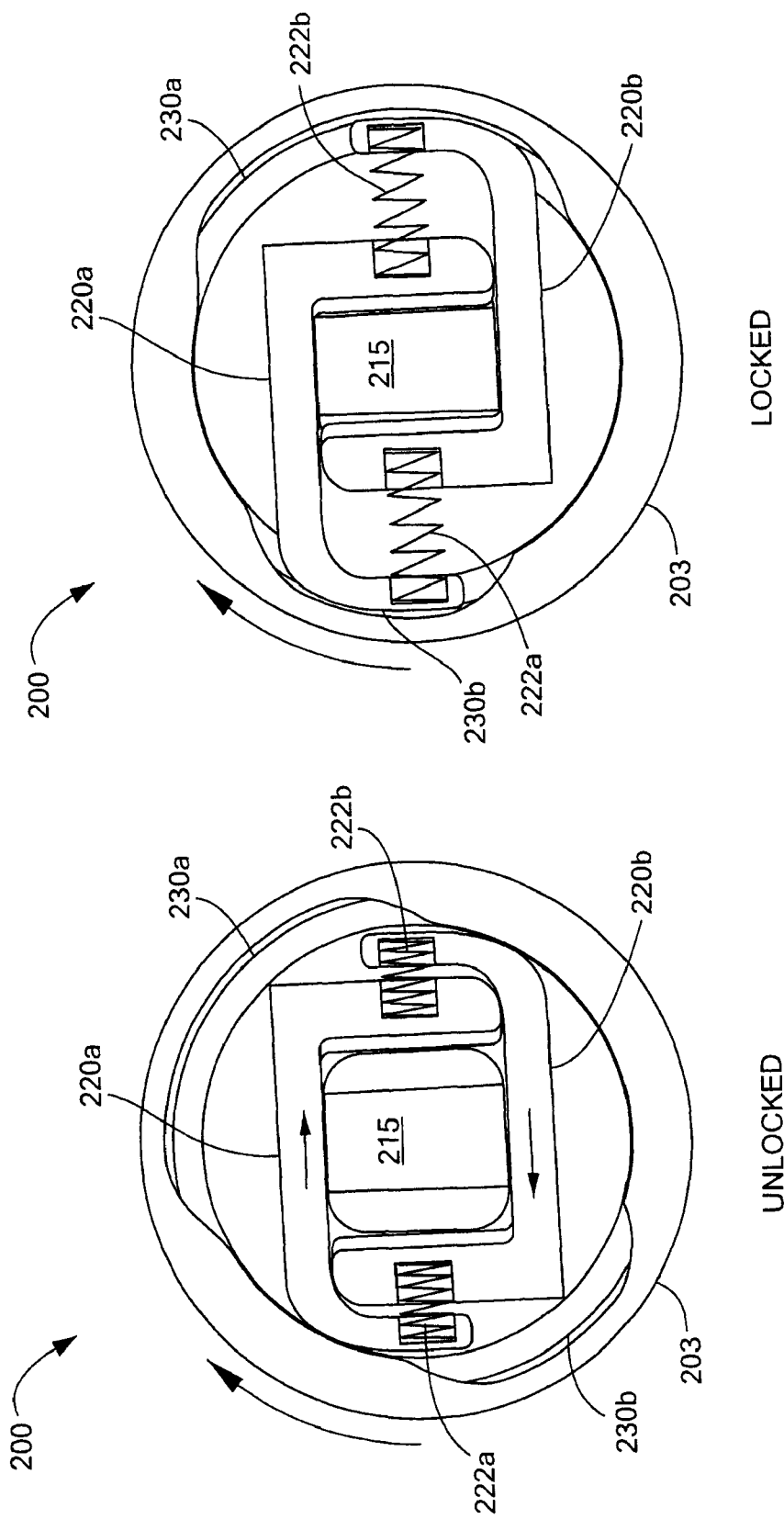

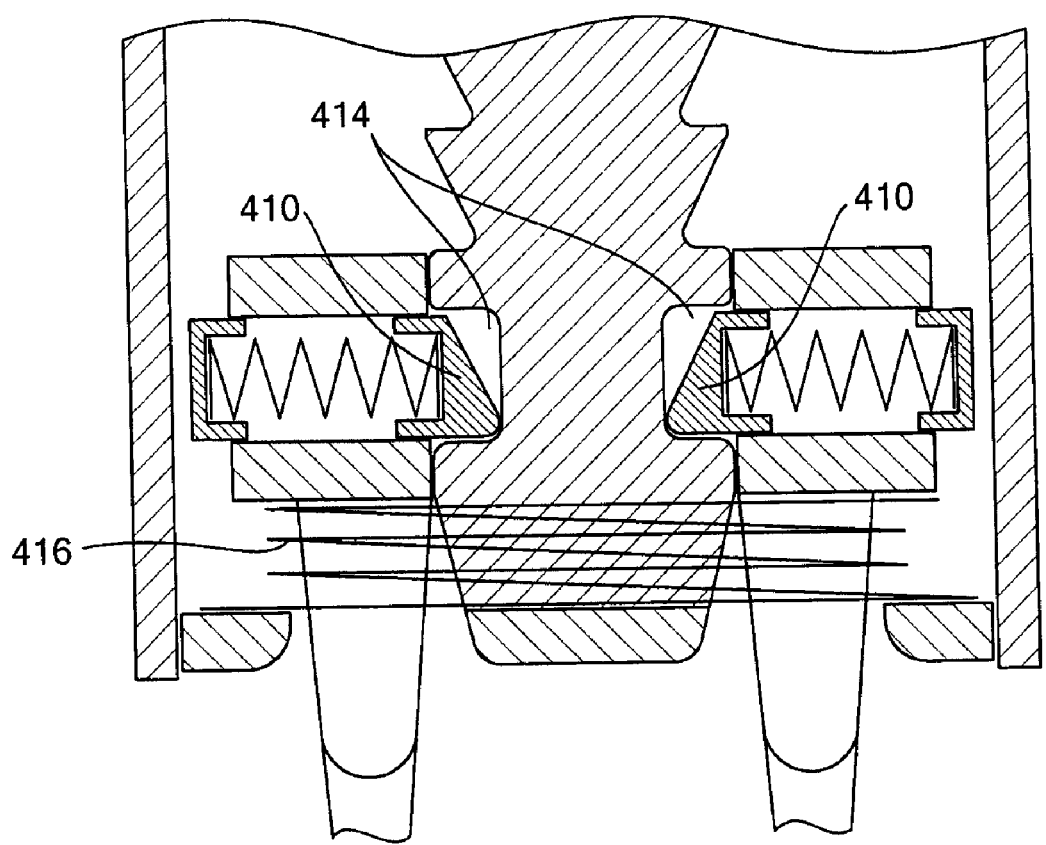
FIG. 6A1

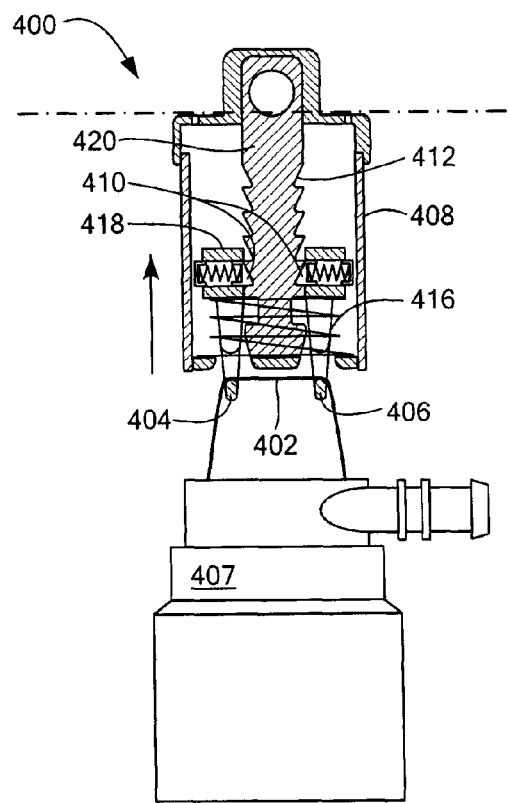
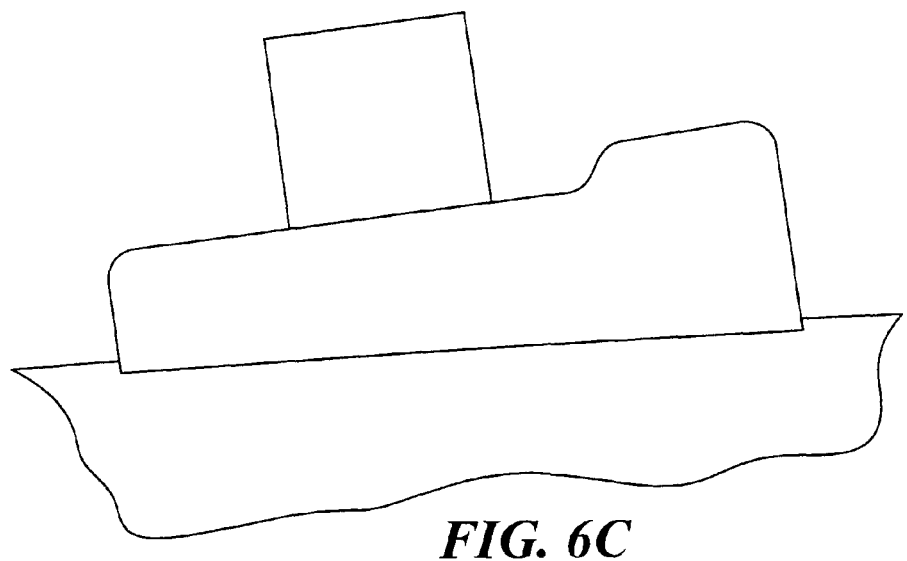
*FIG. 6C*

METHODS AND APPARATUS FOR A CABLE RETRACTOR

BACKGROUND

As is known in the art, vehicles, such as aircraft, can carry items adapted to be released from the vehicle. Prior to release, the item may be attached to the aircraft and can be connected by a communication cable, such as for programming and exchanging information. For example, systems may communicate with the item via a cable to input navigation information. However, during the release process, the cable may be damaged by excessive forces on the cable and/or cable connector. Conventional mechanisms typically utilize a lanyard attached to a cable, which is looped over a bail bar fixed to a rack secured to the aircraft. The connector separates from the item once the tension in the lanyard reaches a predetermined amount. With the amount of slack in the lanyard required to accommodate a range of connector locations, after release the item can roll before connector separation causing damage due to an excessive pull angle on the connector. Once the item is released, the cable can cause further damage by becoming caught in the air stream and striking the rack with great force.

SUMMARY

The present invention provides methods and apparatus for a cable retractor to engage a lanyard for removing slack from a cable coupled to an item to be released from a vehicle, such as an aircraft. With this arrangement, as the item separates from the aircraft the connector releases in a favorable configuration, such as before rolling of the item, to avoid damage to the connector and/or cable. The cable retractor can pull the lanyard into the housing to move the connector up toward the housing to minimize air current forces.

In one aspect of the invention, a cable retractor device comprises a housing having a longitudinal axis, a holder to engage a lanyard for removing a cable connector from an item, a movement mechanism coupled to the holder to move the holder along the longitudinal axis, a lock mechanism to enable bidirectional or unidirectional movement of the movement mechanism in an unlocked condition and unidirectional movement of the movement mechanism in a locked condition, and a bias member coupled to the movement mechanism to pull the lanyard into the housing when the lock mechanism is in the locked condition for moving the connector towards the housing when the item is released.

The cable retractor device can further include additional features such as a connector adapted to connect a releasable item secured to a vehicle, the vehicle is an aircraft, the connector conforms to military standard MIL-STD-1760, the holder includes at least one hook, the movement mechanism includes a ratchet mechanism, the lock mechanism includes pawls to selectively engage the ratchet teeth, the lock mechanism includes first and second members with at least one bias element biasing the lock mechanism to the locked condition, the first and second members are generally U-shaped, the housing includes at least one depression in an inner surface of the housing to provide the locked or unlocked condition, and the rotation of the housing to position at least one depression selects a first one of the locked and unlocked conditions.

In another aspect of the invention, a method comprises providing a cable retractor device including a housing having a longitudinal axis, providing a holder to engage a lanyard for removing a cable connector from an item, providing a movement mechanism coupled to the holder to move the holder along the longitudinal axis, providing a lock mechanism to enable bidirectional or unidirectional movement of the movement mechanism in an unlocked condition and unidirectional movement of the movement mechanism in a locked condition, and providing a bias member coupled to the movement mechanism to pull the lanyard into the housing when the lock mechanism is in the locked condition for moving the connector towards the housing when the item attached to the connector is released.

The method can further include features such as the connector is adapted to connect a releasable item secured to a vehicle, the vehicle is an aircraft, the connector conforms to military standard MIL-STD-1760, the movement mechanism includes a ratchet mechanism, the lock mechanism includes first and second members with at least one bias element biasing the lock mechanism to the locked condition, the housing includes at least one depression in an inner surface of the housing to provide the locked or unlocked condition, and rotating the housing to position at least one depression for selecting a first one of the locked and unlocked conditions.

BRIEF DESCRIPTION OF THE DRAWINGS

The foregoing features of this invention, as well as the invention itself, may be more fully understood from the following description of the drawings in which:

FIG. 4A is a cutaway top view of the cable retractor of FIG. 2 shown in an unlocked condition;

FIG. 4B is a cutaway top view of the cable retractor of FIG. 2 shown in a locked condition;

FIGS. 6A, 6A1, 6B, 6C, 6D, 6E, and 6F show further details of an exemplary sequence of operating a cable retractor in accordance with exemplary embodiments of the invention.

DETAILED DESCRIPTION

Figure 1:
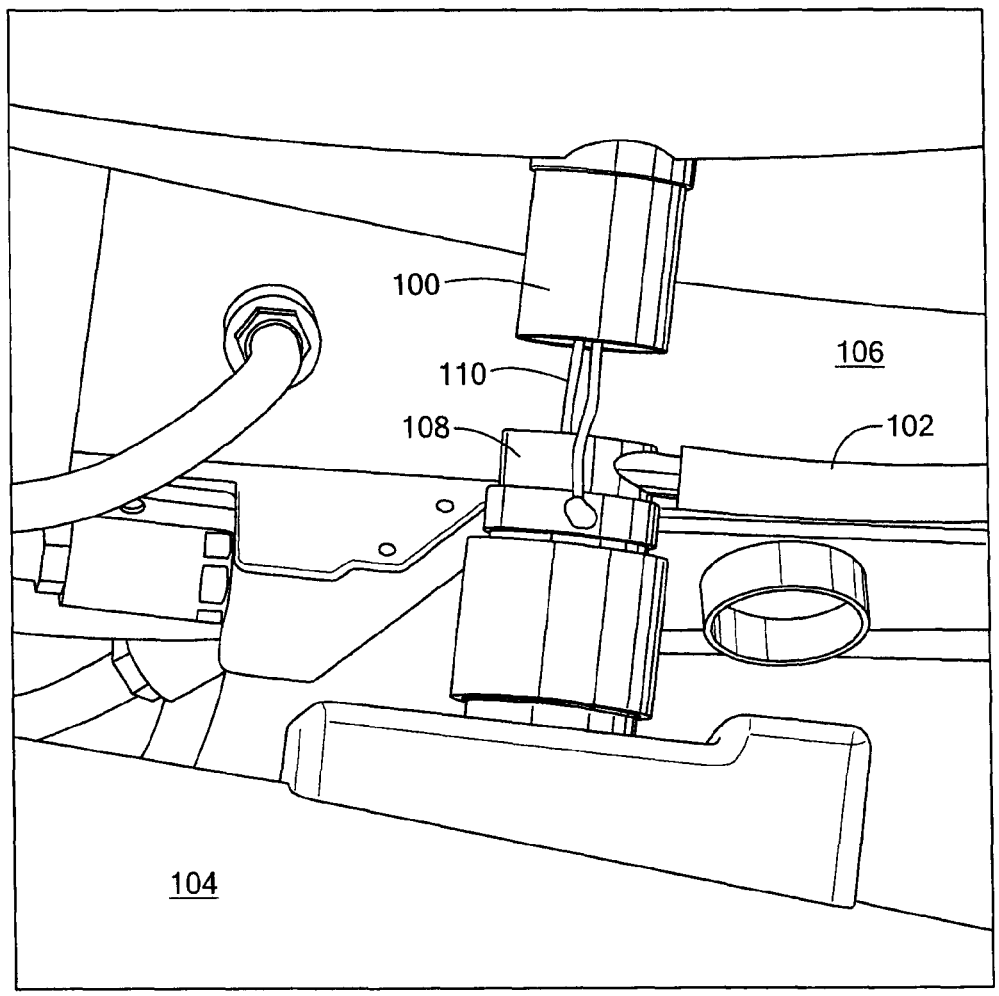
FIG. 1 is a pictorial representation of a cable retractor in accordance with exemplary embodiments of the invention.

FIG. 1 shows an exemplary embodiment of a cable retractor 100 to minimize cable 102 and/or connector 108 damage when an item 104 is released from a moving vehicle 106, such as an aircraft. It is understood that the cable 102 can include electrical and other connections and a lanyard 110 to facilitate removal of the connector 108. In one particular embodiment, the cable connector 108 conforms to military standard MIL-STD-1760 for cable connectors.

In one embodiment, the cable retainer system 100 is useful when items 104, such as missiles, separate from an aircraft 106. In general, the cable retractor 100 enhances the process of detaching the cable connector 108 using the lanyard 110 to reduce the likelihood of damage to the cable/connector. More particularly, the cable retractor 100 removes slack in the cable 102 so that as the item separates from the aircraft 106 the connector reaches a given release pressure threshold before the item 104 has a chance to roll or otherwise change position in the air stream. Reducing cable 102 slack leads to less damage to the connector 108 due to a straighter pull angle. In one embodiment, after the connector 108 has been pulled from the item, the connector is pulled up, such as to the retractor, and the connector is secured to prevent the cable and connector from being buffeted by the air currents for reducing the possibility of damage to the aircraft and/or cable/connector.

Figure 2:
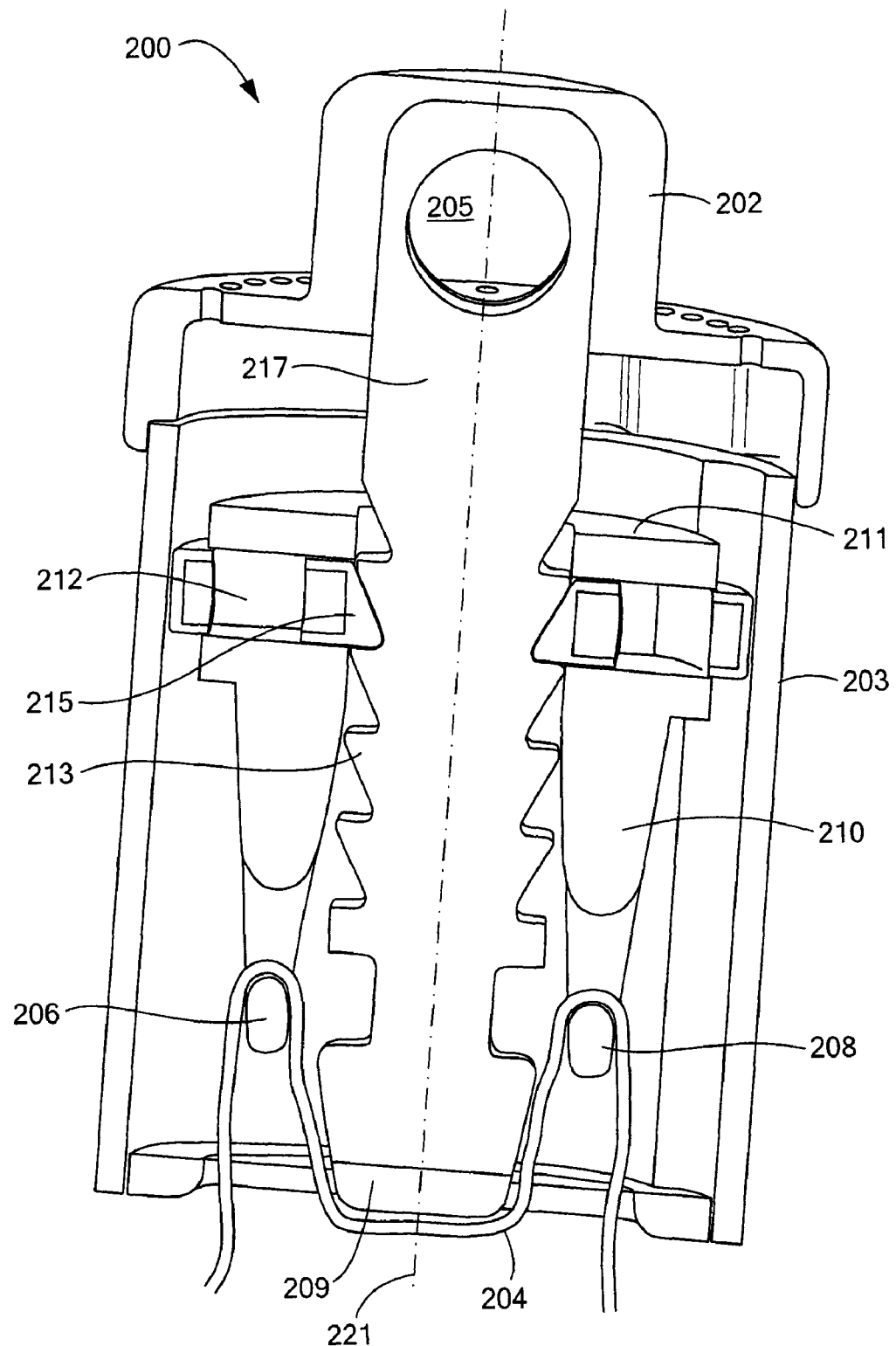
FIG. 2 is a cutaway side view of an exemplary cable retractor in accordance with exemplary embodiments of the invention.

FIG. 2 shows an exemplary cable retractor 200 having a connecting mechanism 202 for securing the cable to the vehicle. The connecting mechanism 202 extends from a housing 203 that is cylindrical in the illustrated embodiment. In one embodiment, the connecting mechanism 202 includes an aperture 205 through which a bar can be placed to secure the cable retractor 200 in position.

In general, the cable retractor 200 has a locked condition in which unidirectional movement pulls a lanyard 204 up into the housing 203 to remove cable slack and an unlocked condition in which bidirectional movement is permitted, as described more fully below. In one embodiment, movement is along a longitudinal axis 221 of the housing 203. The cable retractor 200 is shown with the lanyard 204 threaded through a holder mechanism having first and second hooks 206, 208. As described more fully below, a movement mechanism 210, shown as a ratchet, works in conjunction with a lock mechanism 212 to provide the locked and unlocked conditions.

In an exemplary embodiment, the ratchet 210 includes a slider 211, which has ratchet pawls 215, reciprocating on a shaft 217. The pawls 215 are selectively engaged with complimentary ratchet teeth 213 on the shaft 217. The lock mechanism 212 controls whether the pawls 215 engage the ratchet teeth 213, as discussed in detail below.

Figure 2A:
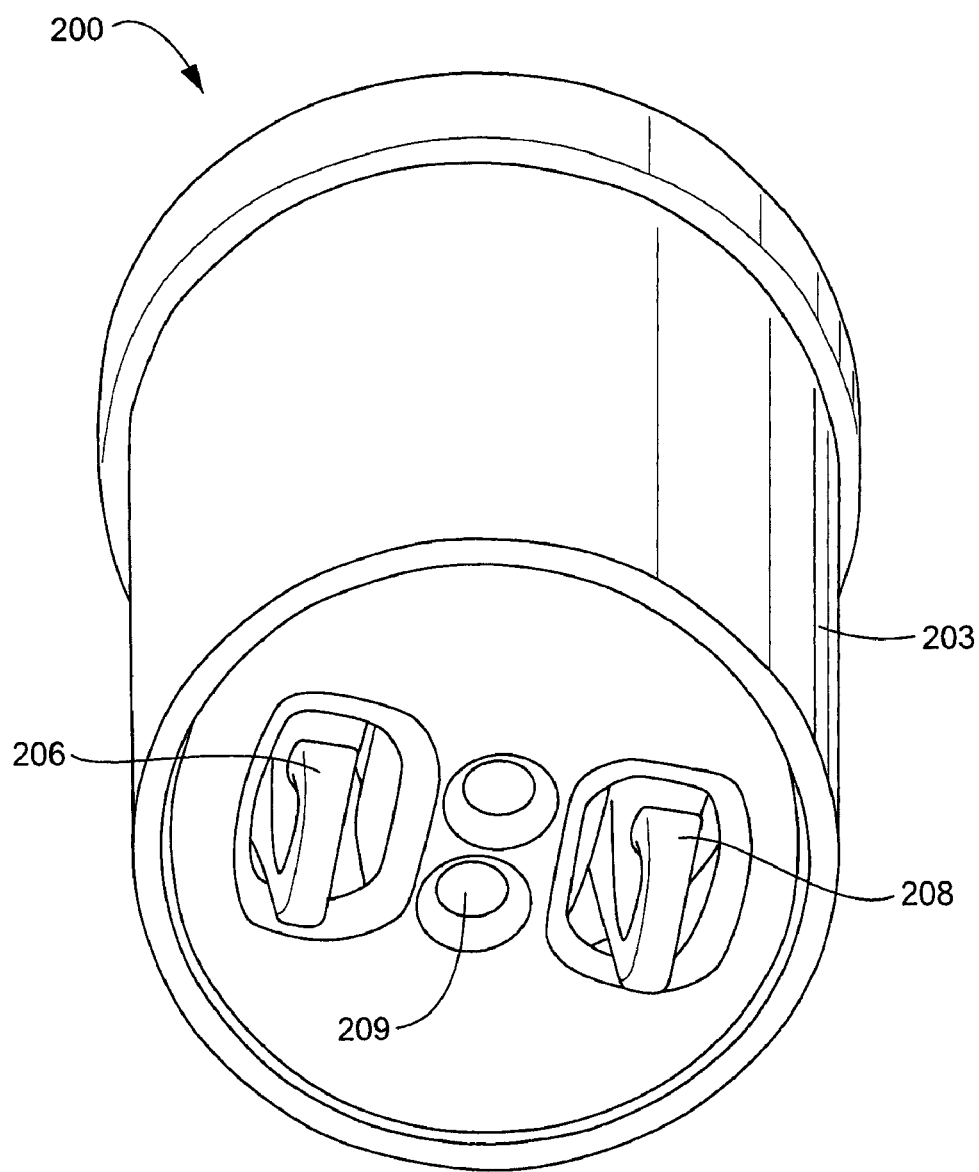
FIG. 2A is a pictorial representation showing a bottom of a cable retractor in accordance with an exemplary embodiment of the invention.

FIG. 2A shows a perspective view of an exemplary bottom configuration of the cable retractor 200 to more clearly demonstrate how the lanyard (not shown) is threaded into the first and second hooks 206, 208 to enable pulling the lanyard into the housing 203 for reducing slack in the cable while a center region 209 in between the first and second hooks keeps a portion of the lanyard 209 external to the housing 203. This arrangement increases the ability of the cable retractor 200 to remove slack from the cable by increasing the length of lanyard inside the housing.

Figure 3B:
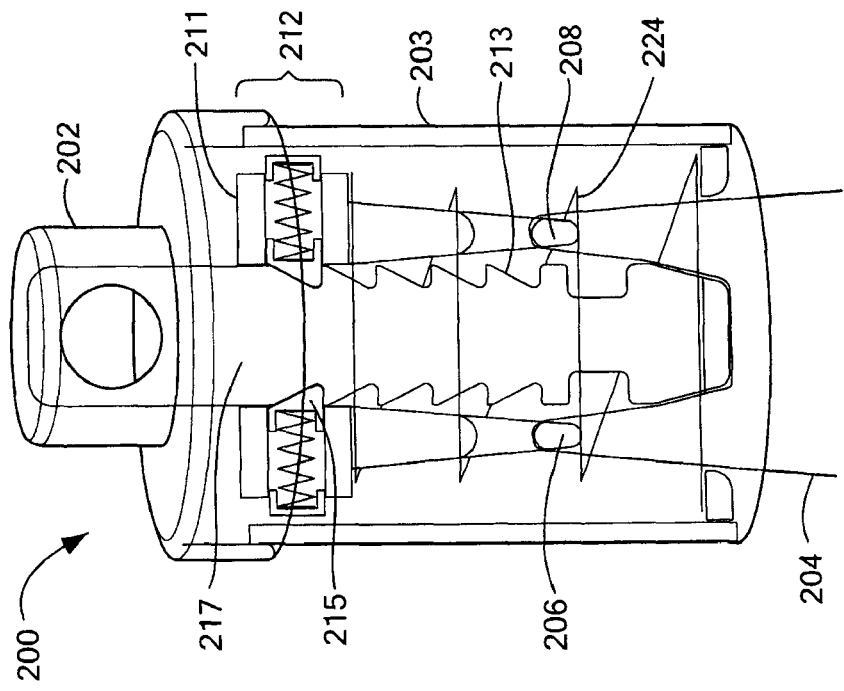
FIG. 3B is a pictorial representation of the cable retractor of FIG. 2 shown in a locked condition.
Figure 3A:
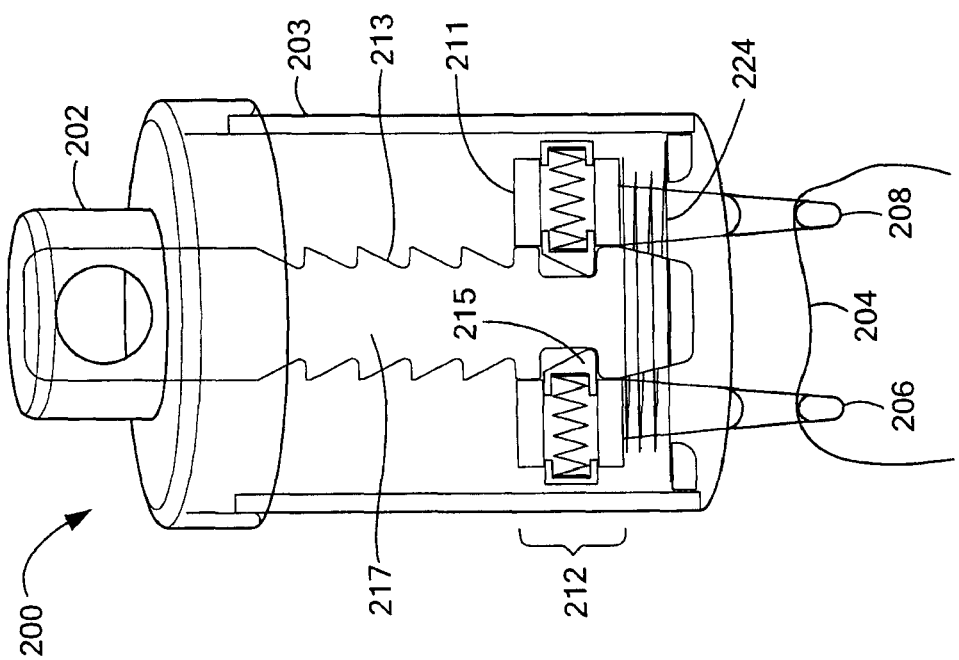
FIG. 3A is a pictorial representation of the cable retractor of FIG. 2 shown in an unlocked condition.

FIGS. 3A and 4A shows the cable retractor 200 in an unlocked condition and FIGS. 3B and 4B show the cable retractor in a locked condition. The lock mechanism 212 includes opposing first and second U-shaped members 220a, b each biased to the locked condition by respective first and second bias members 222a,b, which can be provided as springs. As shown in FIGS. 3A and 3B, a slack bias member 224, such as a spring, biases the slider 211 into the housing 203.

As shown most clearly in FIGS. 4A (unlocked condition) and 4B (locked condition), in an exemplary embodiment, the interior of the housing 203 has opposing depressions 230a,b that enable the first and second bias members 222a,b to push the U-shaped members 222a,b into the locked condition in which the pawls 220a and 220b engage the ratchet teeth 215. By rotating the housing 203, and thereby controlling the location of the depressions 230a,b with respect to the U-shaped members 220a,b, the user can place the cable retractor to the locked or unlocked condition as desired thereby providing a transition mechanism.

In one embodiment, because the ratchet is spring-loaded, the lanyard is given a slight pre-tension. The ratchet locks and maintains the pre-tension, removing slack from the lanyard and ensuring that the connector is pulled with minimum separation distance as the item attached to the cable is jettisoned. This arrangement minimizes damage to the connector during release. After release, the spring continues to pull the lanyard until the connector is wedged against the bottom of the cable retractor, where the ratchet locks it into place.

Figure 5:
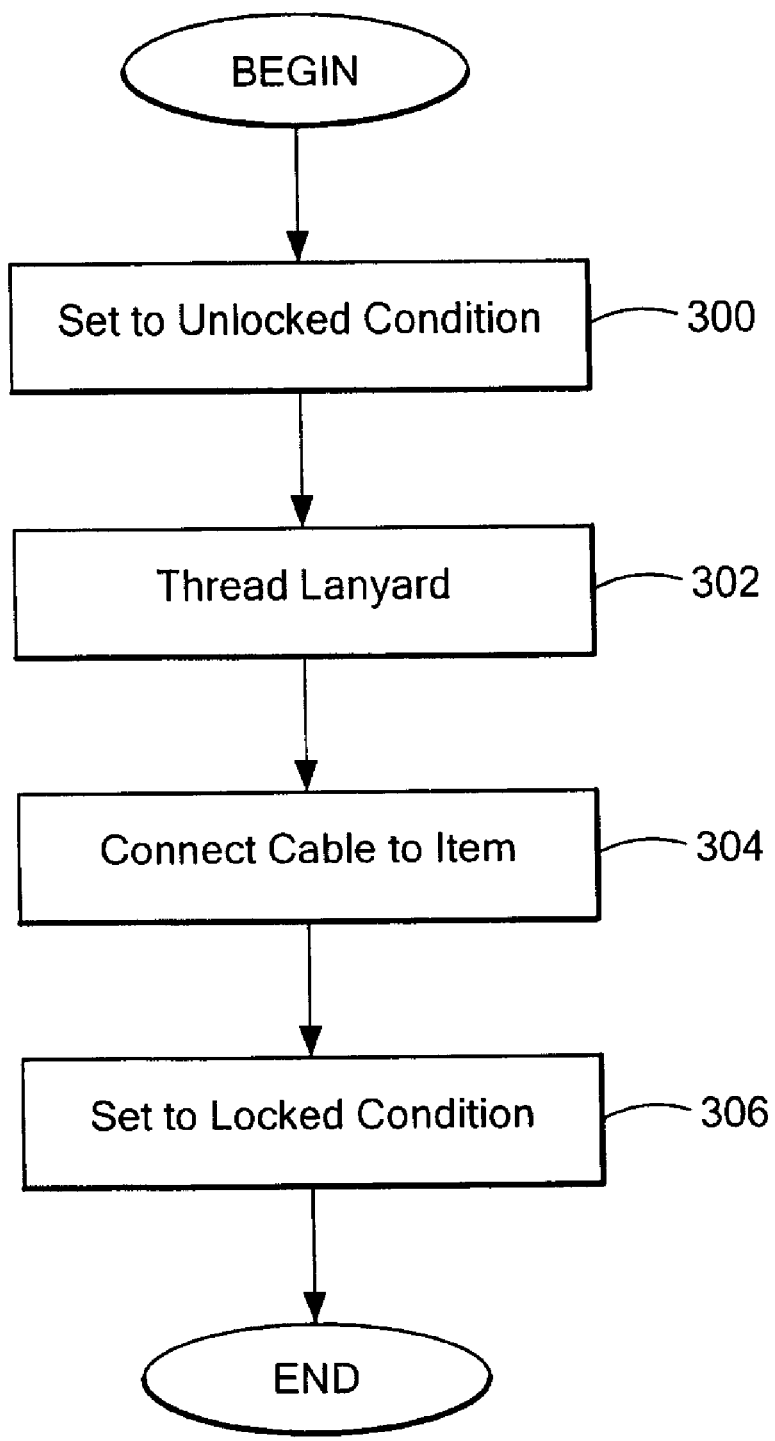
FIG. 5 is a flow diagram showing an exemplary sequence of steps for operating a cable retractor in accordance with exemplary embodiments of the invention.

FIG. 5 shows an exemplary sequence of steps to load and unload an item attached via cable to the cable retractor. In step 300, the pawls are released from the ratchet shaft by rotating the outer shell of the retractor housing by about forty-five degrees. As described above, the release mechanism utilizes a housing with a varying internal contour that, when turned, depresses the pawls so that they no longer grab the ratcheting surface, allowing the slider to move in either direction. The bottom-most groove in the ratcheting surface is cut slightly deeper, so that the pawls keep the slider from moving back up. In step 302, the lanyard of a further item is engaged with the cable retractor hooks and in step 304 the cable is connected to the item. In step 306, the housing is again rotated by about forty-five degrees to activate the ratchet mechanism, which then allows only unidirectional movement.

Figure 6A:
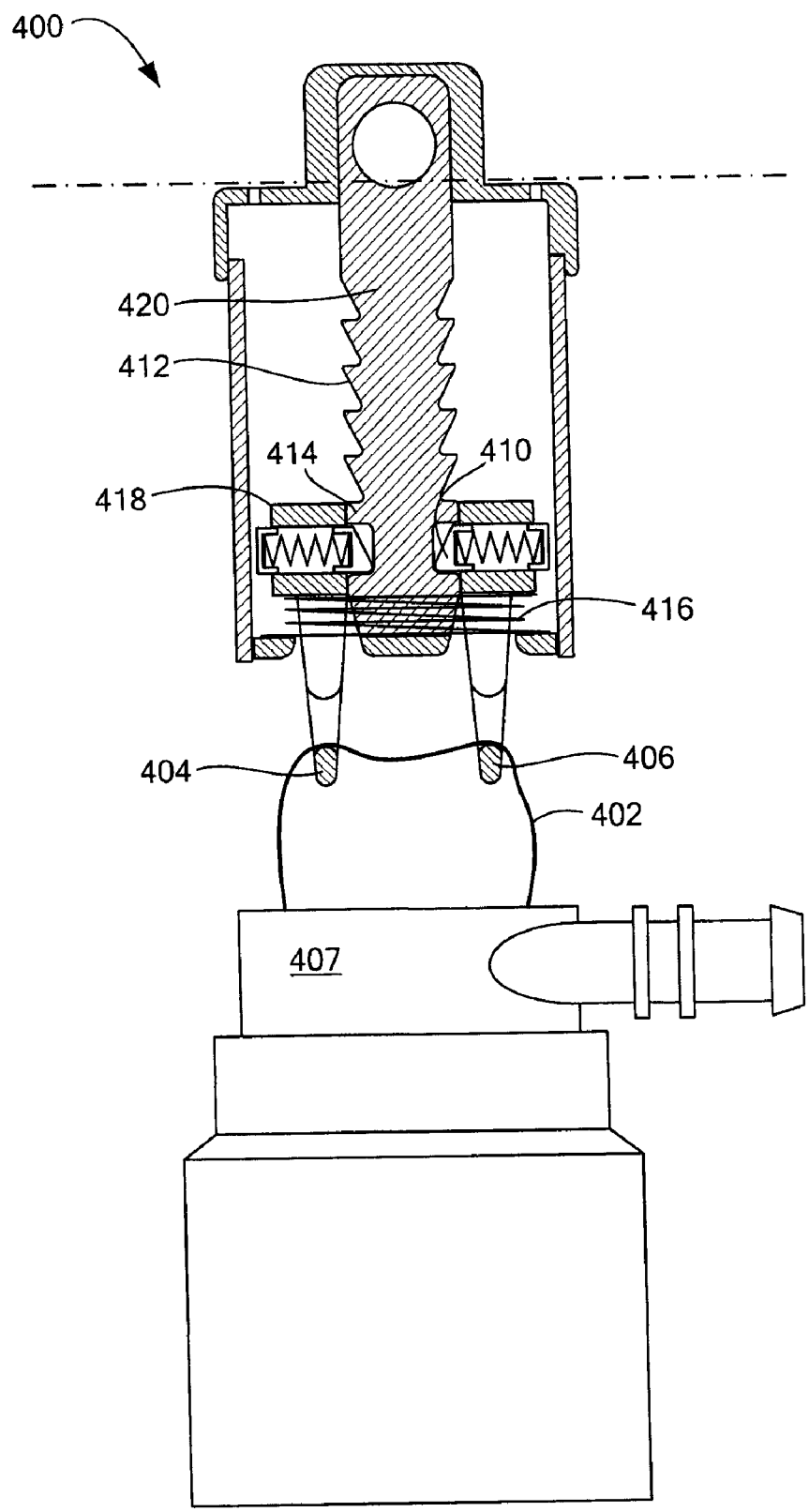

FIGS. 6A-6F show further details in operating exemplary embodiments of the cable retractor. In FIG. 6A, the cable retractor 400 is ready for a user to thread the lanyard 402 through first and second hooks 404, 406 to facilitate removal of a cable connector 407. If not already done, a user rotates the housing 408 to the unlocked position. In the unlocked position, the pawls 410 do not engage the ratchet teeth 412 to enable bidirectional movement. In one embodiment, the bottom-most groove 414, as seen in FIG. 6A1, is cut deeper to prevent the slider 418 from moving back up the shaft 410 in the unlocked position.

Figure 6B:
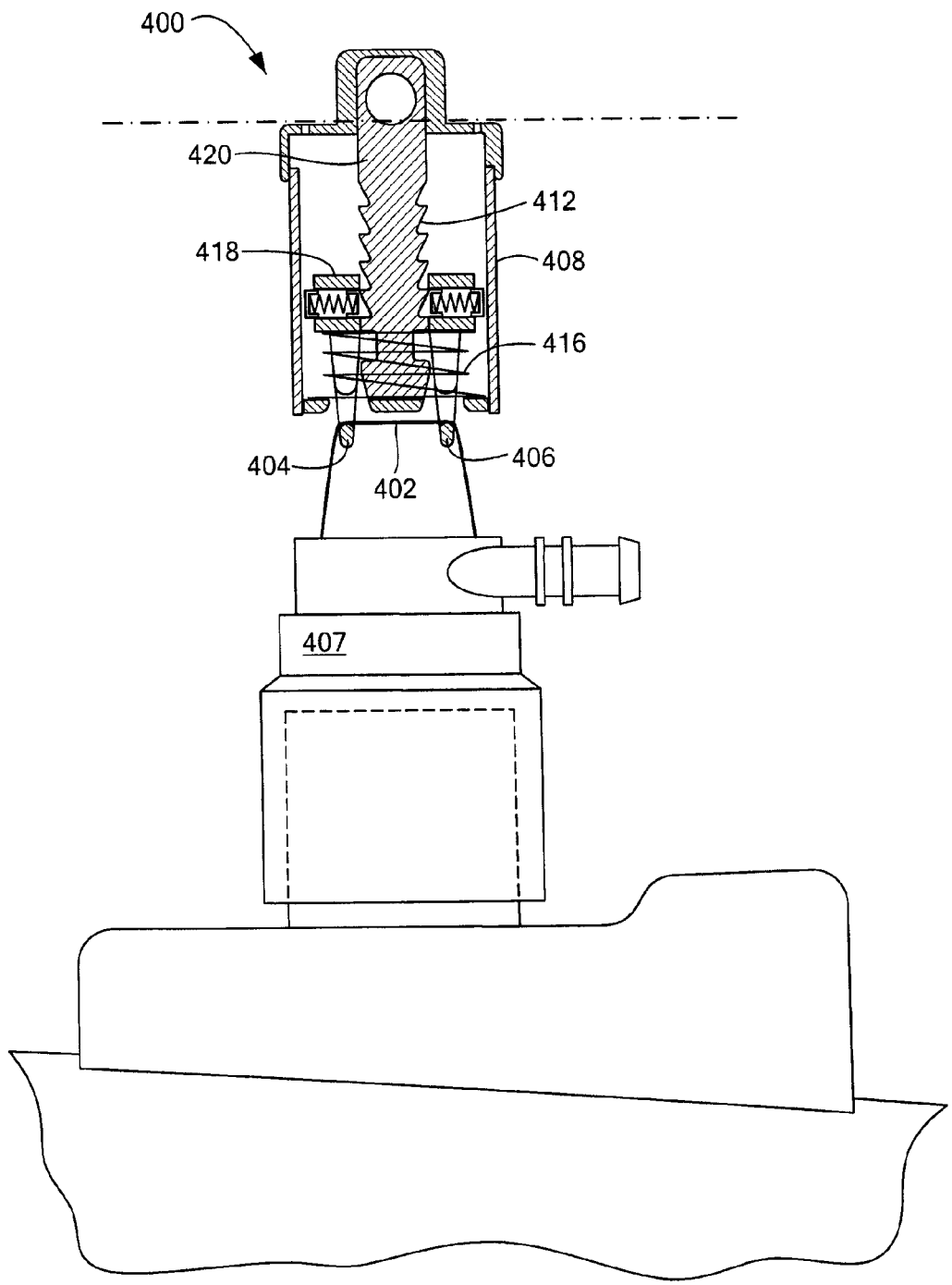

As shown in FIG. 6B, after an item is attached to the cable retractor, and the housing 408 is rotated to set the cable retractor in the locked condition, the ratchet is released and a bias element 416, shown as a spring, pushes the hooks 404, 406 at least up to the first ratchet position thereby pulling on the lanyard and removing slack.

Figure 6D:
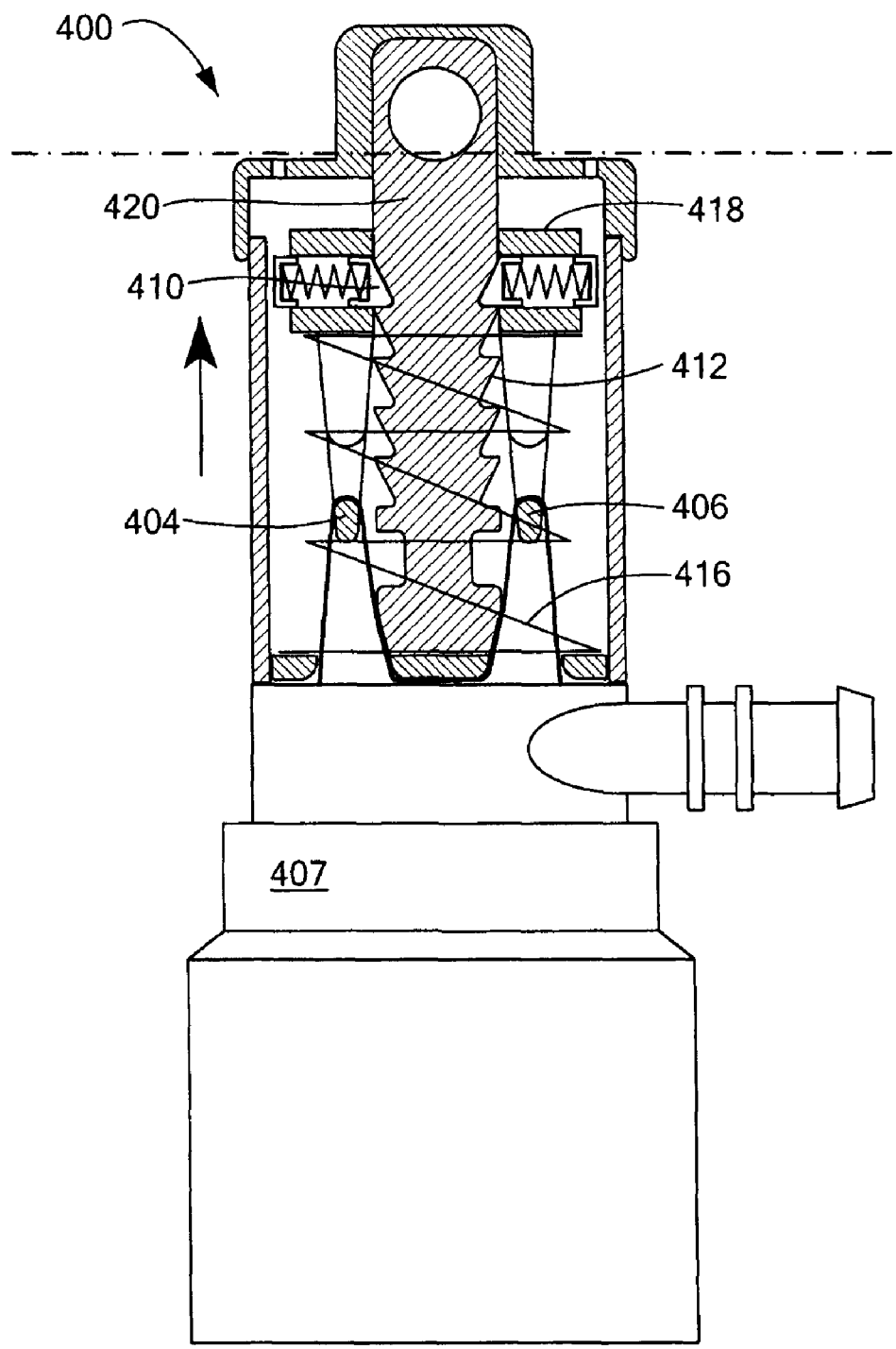

FIG. 6C shows the cable retractor immediately after the item is released from the aircraft. As shown in FIG. 6D, the bias element 416 pushes the slider 418 and hooks 404, 406 up into the housing so that connector 407 is less susceptible to wind and other forces. Since the connector is constricted in movement, the likelihood of damage to the connector, aircraft and other components is decreased. In an exemplary embodiment, the connector 407 is pulled up flush to the housing 408.

Figure 6E:
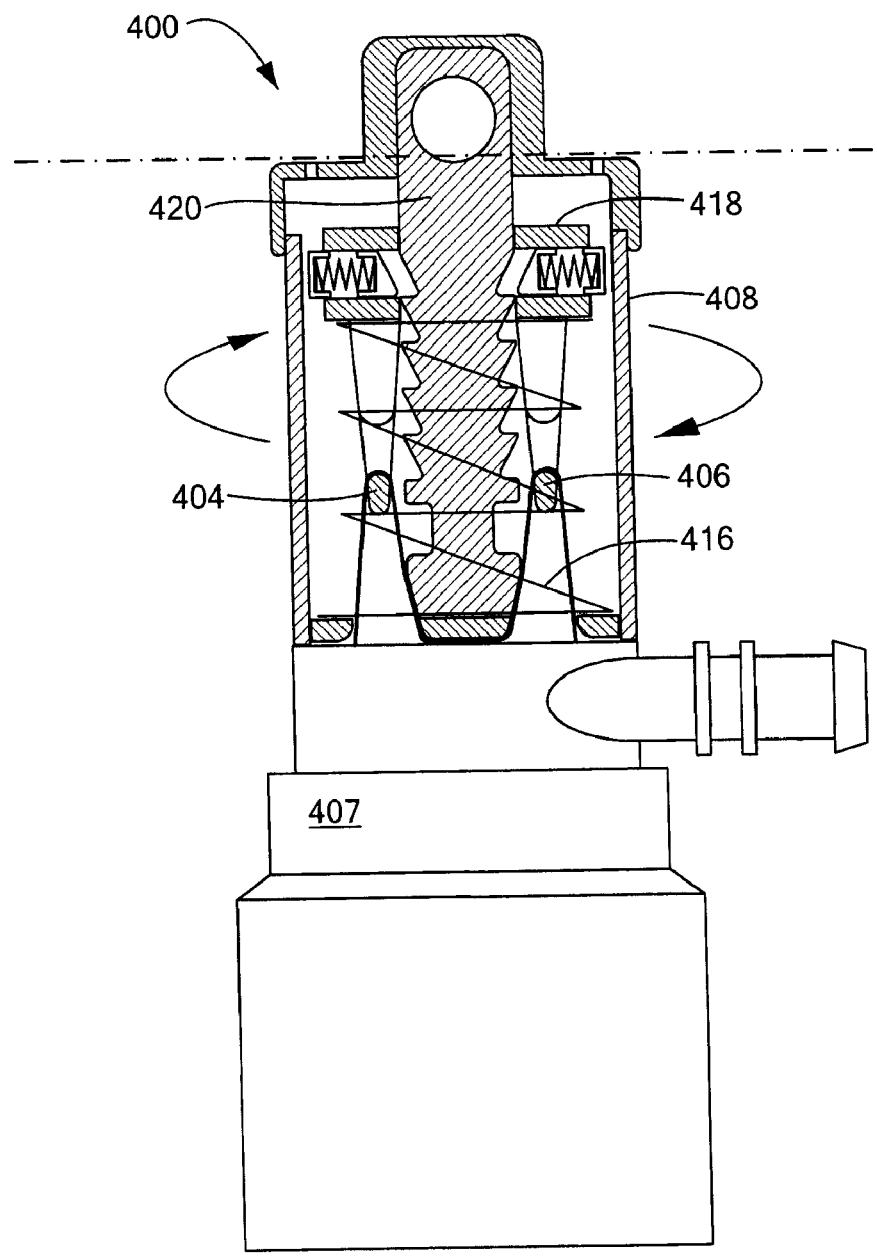
Figure 6F:
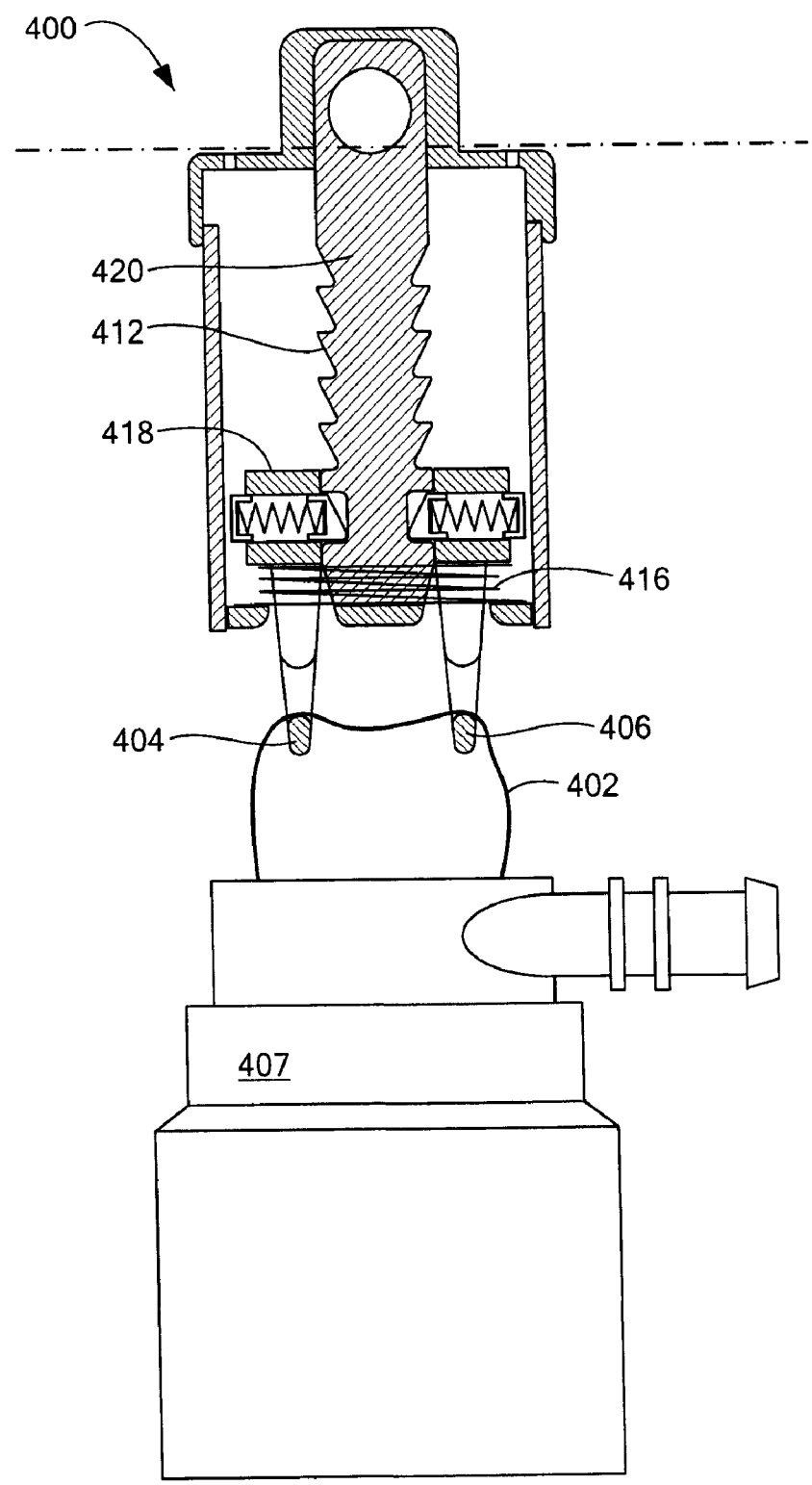

As shown in FIG. 6E, when the aircraft has landed and the cable retractor is ready to receive another item, the housing 408 is again rotated to allow bidirectional movement so that the hooks 404, 406 can be lowered for threading of the lanyard, as shown in FIG. 6F.

Figure 7:
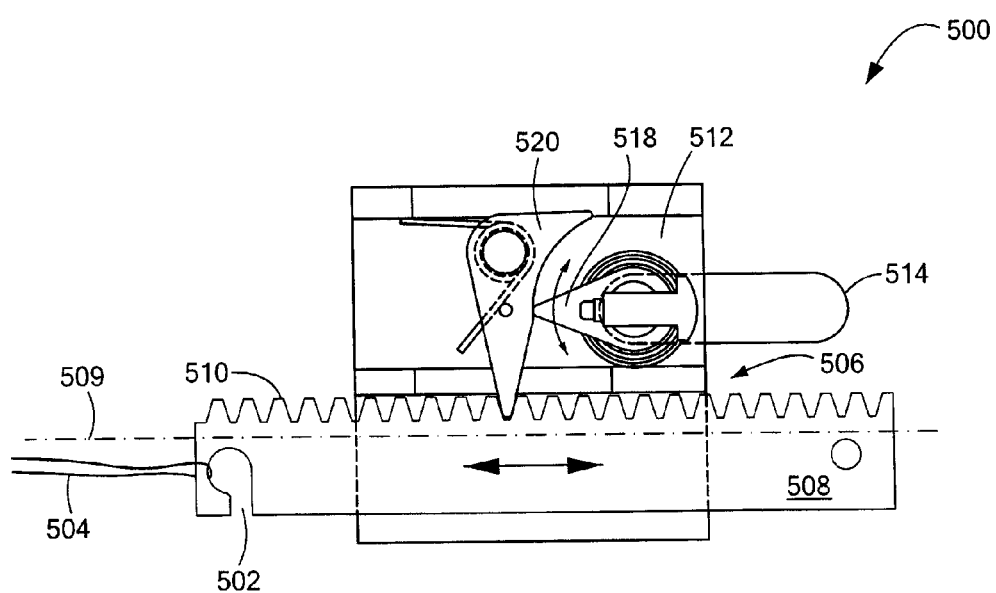
FIG. 7 is a schematic depiction of a further exemplary embodiment of a cable retractor in accordance with exemplary embodiments of the invention.

FIG. 7 shows a further exemplary embodiment of a cable retractor 500 in accordance with illustrative embodiments of the invention. The cable retractor 500 includes a holder 502 to engage a lanyard 504, which can remove a connector (not shown) from an item. A movement mechanism 506 includes a slider 508 shown as a gear rack having a series of teeth 510. A lock mechanism 512 enables movement of slider 508 in one direction in a locked condition and the opposite direction in an unlocked condition, as described more fully below. The slider 508 can move along a longitudinal axis 509. As can be seen, a transition mechanism 514 includes a handle 516 controlling an arm 518 that can be positioned to allow movement of a pawl 520 of the lock mechanism in one direction for the locked condition, and in the other direction for the unlocked condition. As noted above, the slider 508 moves in opposite directions in the locked and unlocked conditions dictated by the position of the arm 518 and pawl 520.

Figure 8A:
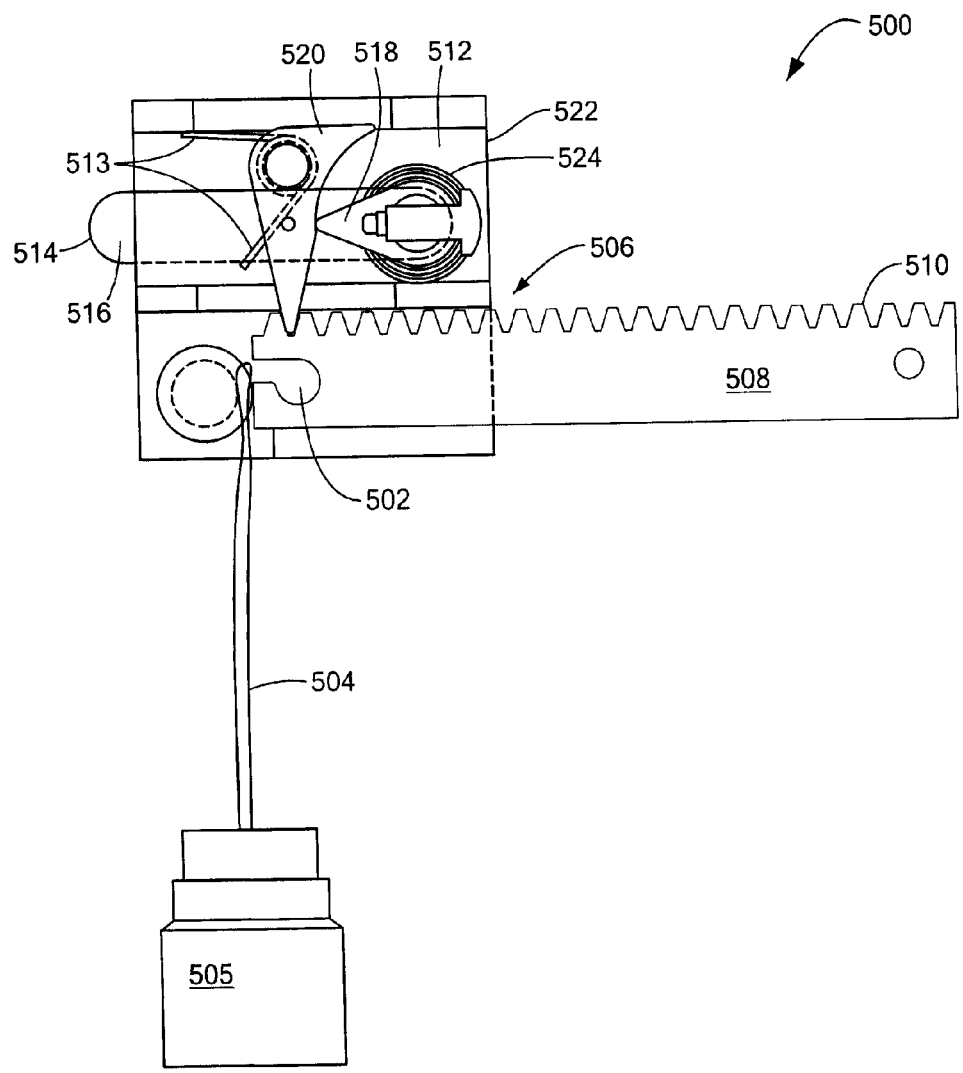
FIG. 8A is a partial sectional view of a cable retractor in accordance with exemplary embodiments of the invention shown in a locked condition with an extended movement mechanism.
Figure 8B:
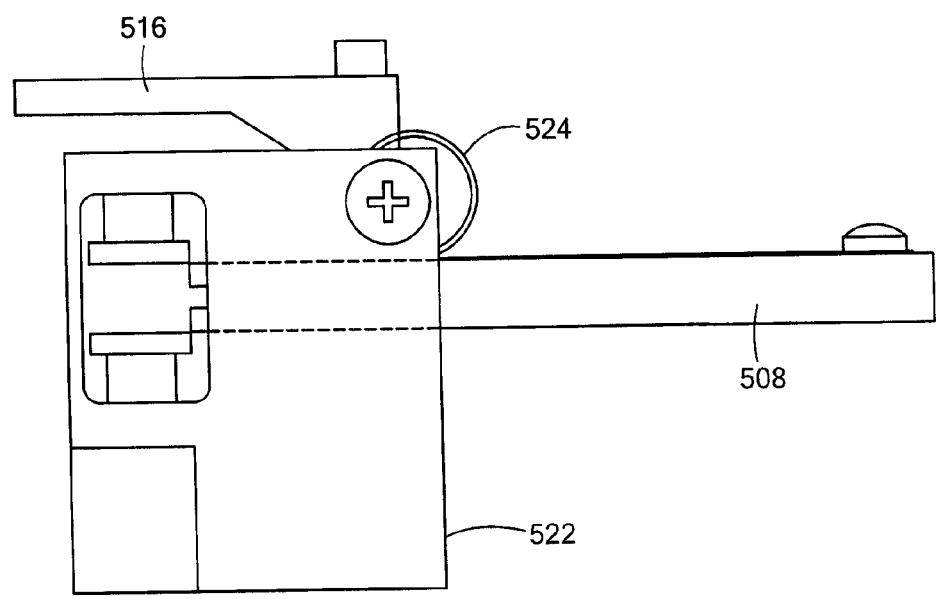
FIG. 8B is a bottom view of the cable retractor of FIG. 8A.

FIGS. 8A and 8B show the cable retractor 500 in the locked condition. The slider 508 is fully extended to enable threading of the lanyard 504, which is coupled to a connector 505. When the slider is fully extended, the handle 516 is used to manipulate the arm 518 to the locked position, which enables unidirectional movement of the slider into a housing 523 of the cable retractor 500. A spring 524 biases the slider so as to pull on the lanyard 504 and move the connector 505 towards the housing 522.

In one embodiment, the lock mechanism 512 includes first and second springs 513 to bias the pawl 520 to a position in which the pawl is engaged with the slider teeth 510. Depending upon whether the lock mechanism is set to the locked or unlocked condition, the pawl 520 rotates in one direction to disengage from the teeth and allow movement of the slider 508.

Figure 8C:
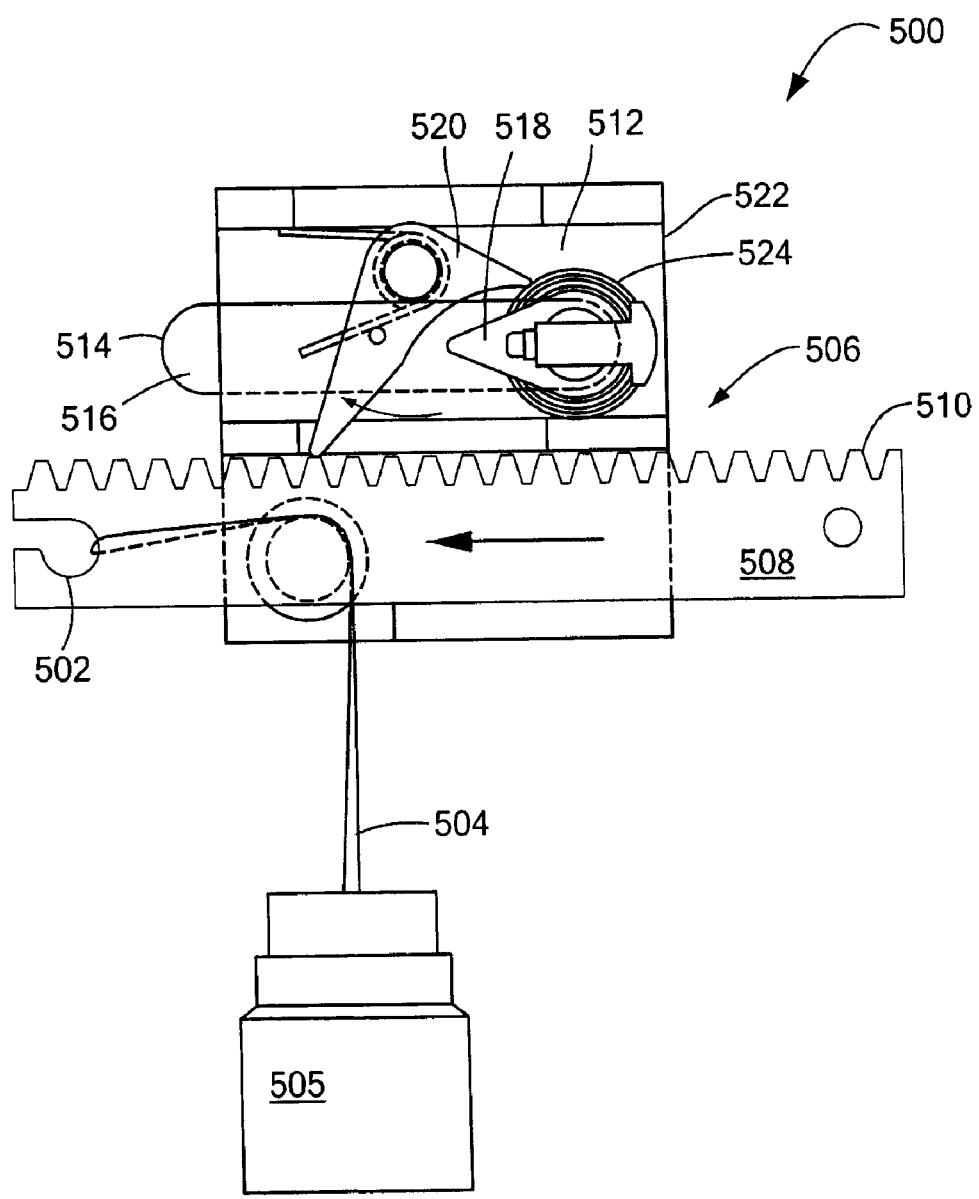
FIG. 8C is a partial sectional view of the cable retractor of FIG. 8A after movement of a slider in the movement mechanism.
Figure 8D:
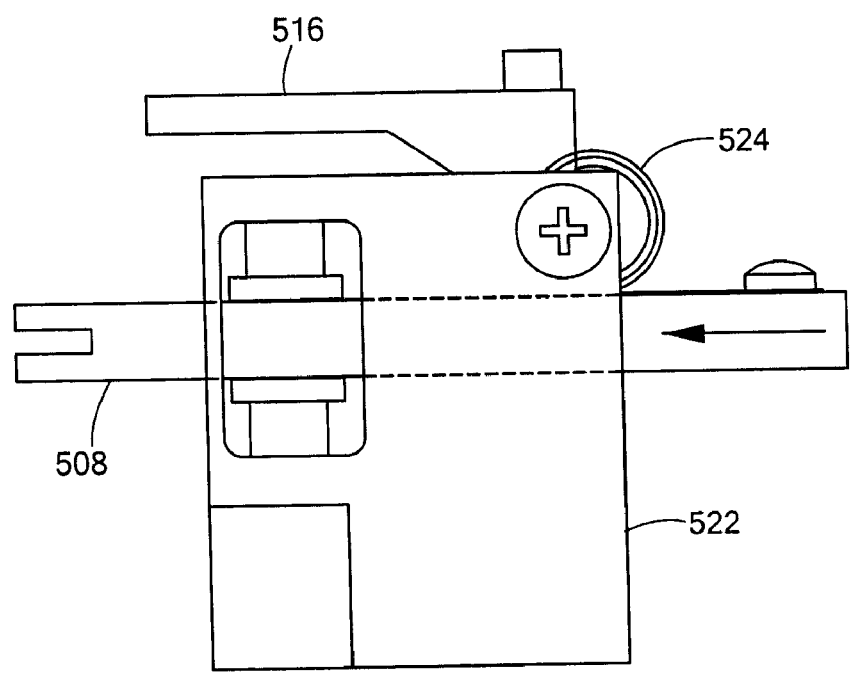
FIG. 8D is a bottom view of the cable retractor of FIG. 8C.

FIGS. 8C and 8D show movement of the slider 508 into the housing 522. The pawl 520 is allowed to pivot based upon the position of the arm 518, which is positioned in the locked condition. Movement of the slider 508 removes slack in the lanyard 504. The spring 524 biases the slider 508 to move into the housing.

Figure 8E:
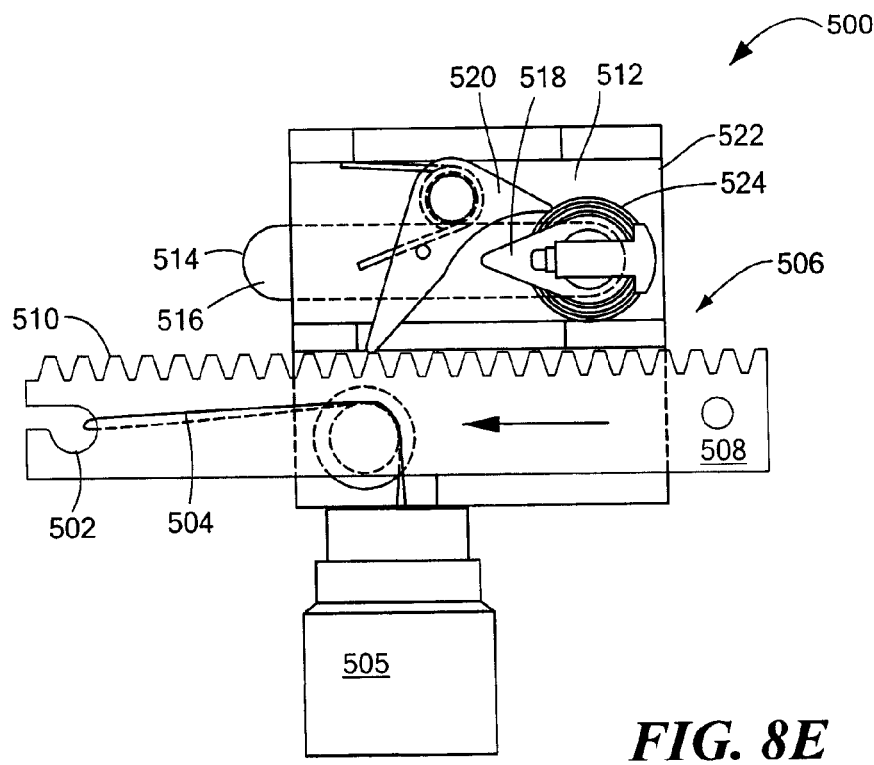
FIG. 8E is a partial sectional view of the cable retractor of FIG. 8A with the movement mechanism retracted.
Figure 8F:
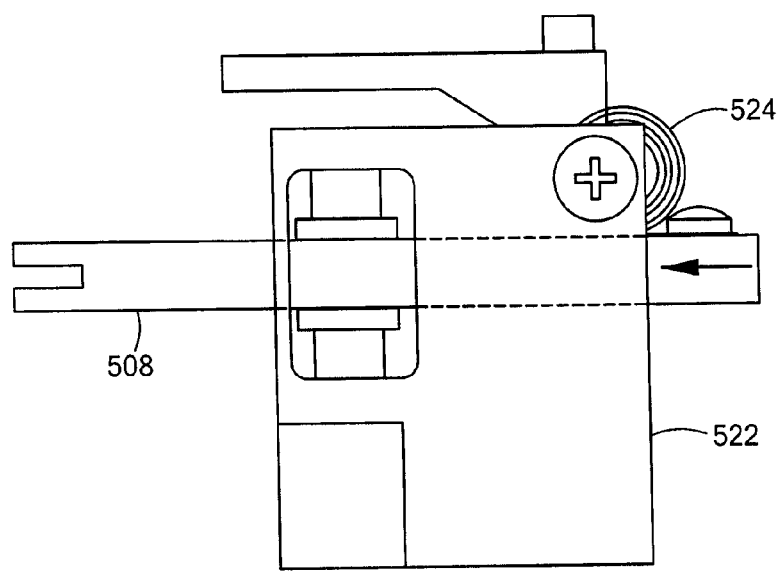
FIG. 8F is a bottom view of the cable retractor of FIG. 8E.

FIGS. 8E and 8F show the slider 508 fully retracted with the connector 505 abutting the housing 522. Since the lock mechanism 512 is set to the locked condition, the pawl 520 rotates to allow the slider 508 to move into the housing.

Figure 8G:
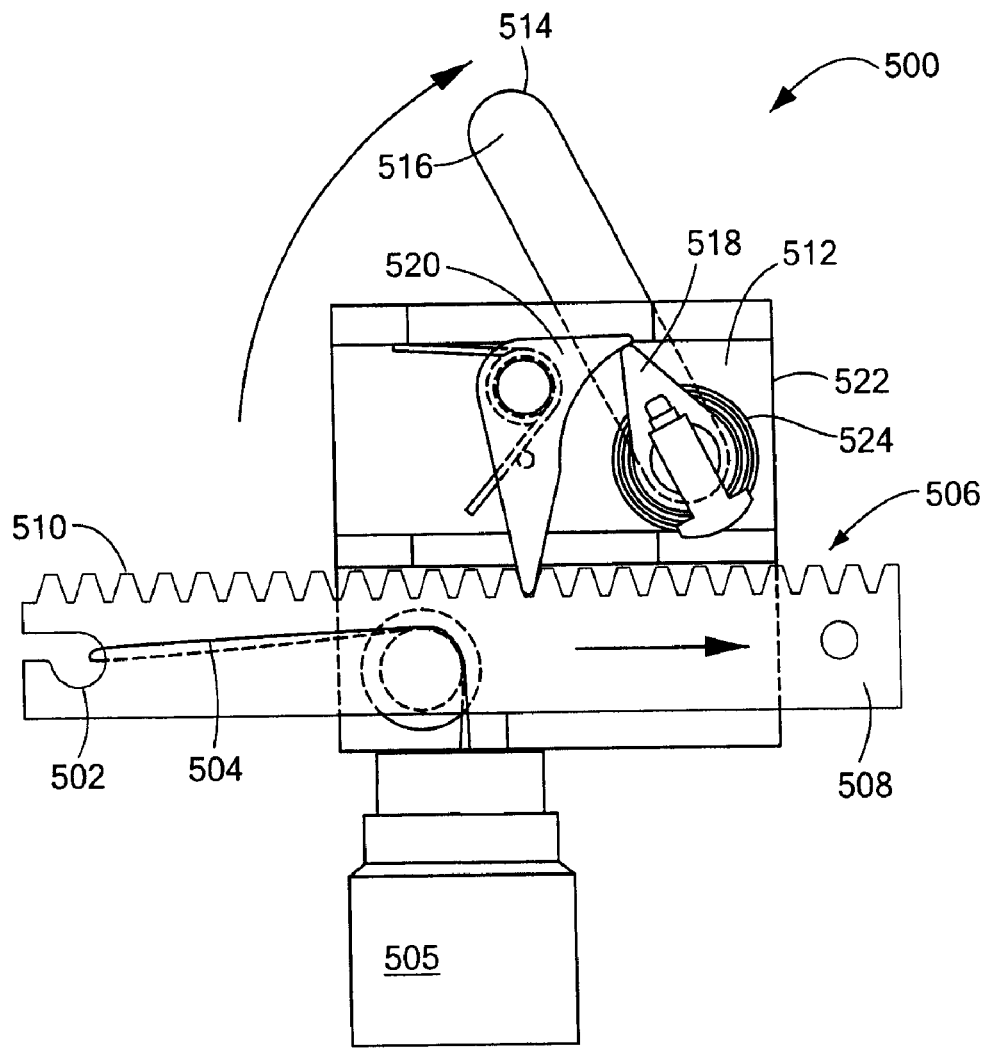
FIG. 8G is a partial sectional view of the cable retractor of FIG. 8A in the unlocked condition.
Figure 8H:
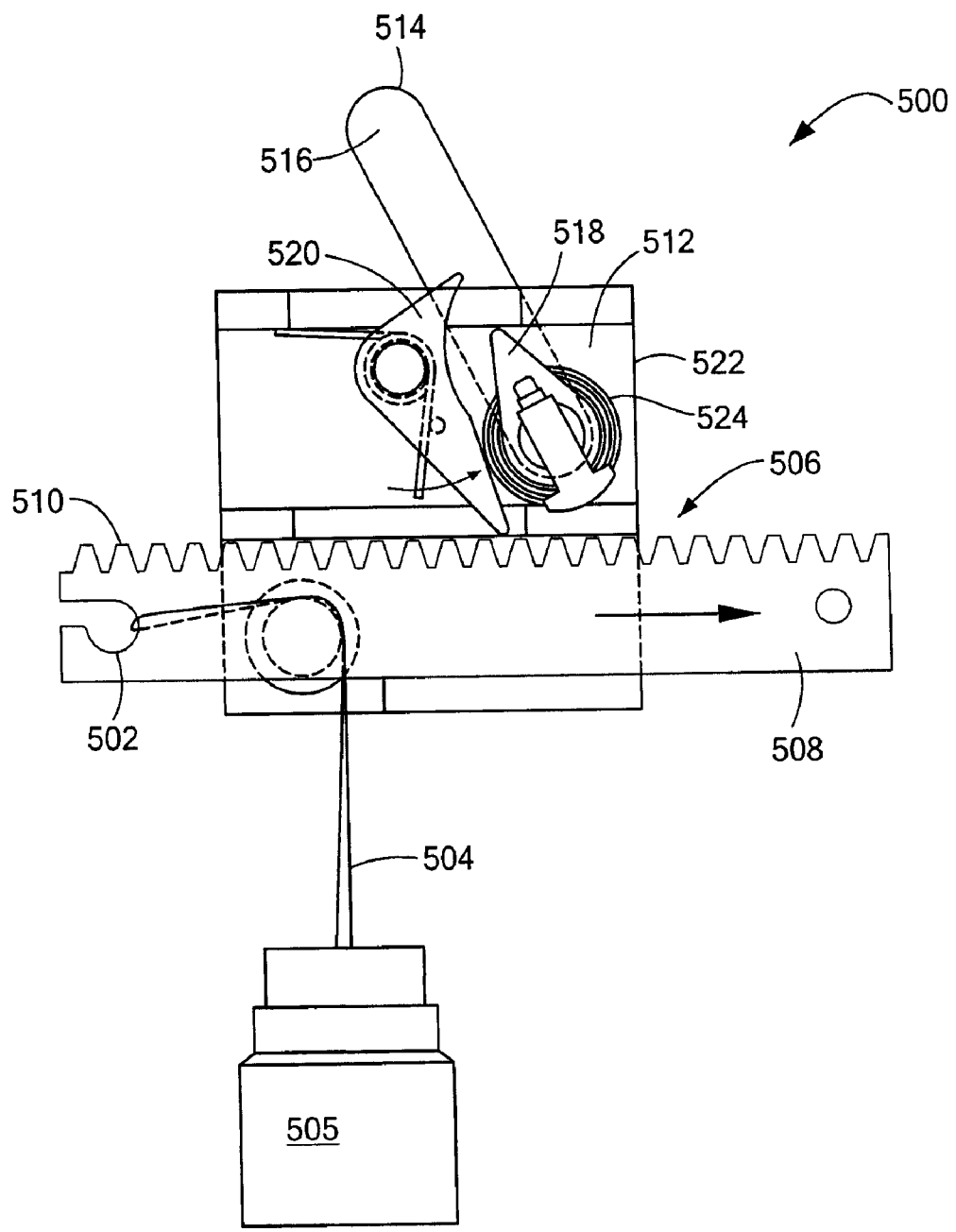
FIG. 8H is a partial sectional view of the cable retractor of FIG. 8G after movement of the movement mechanism.
Figure 8I:
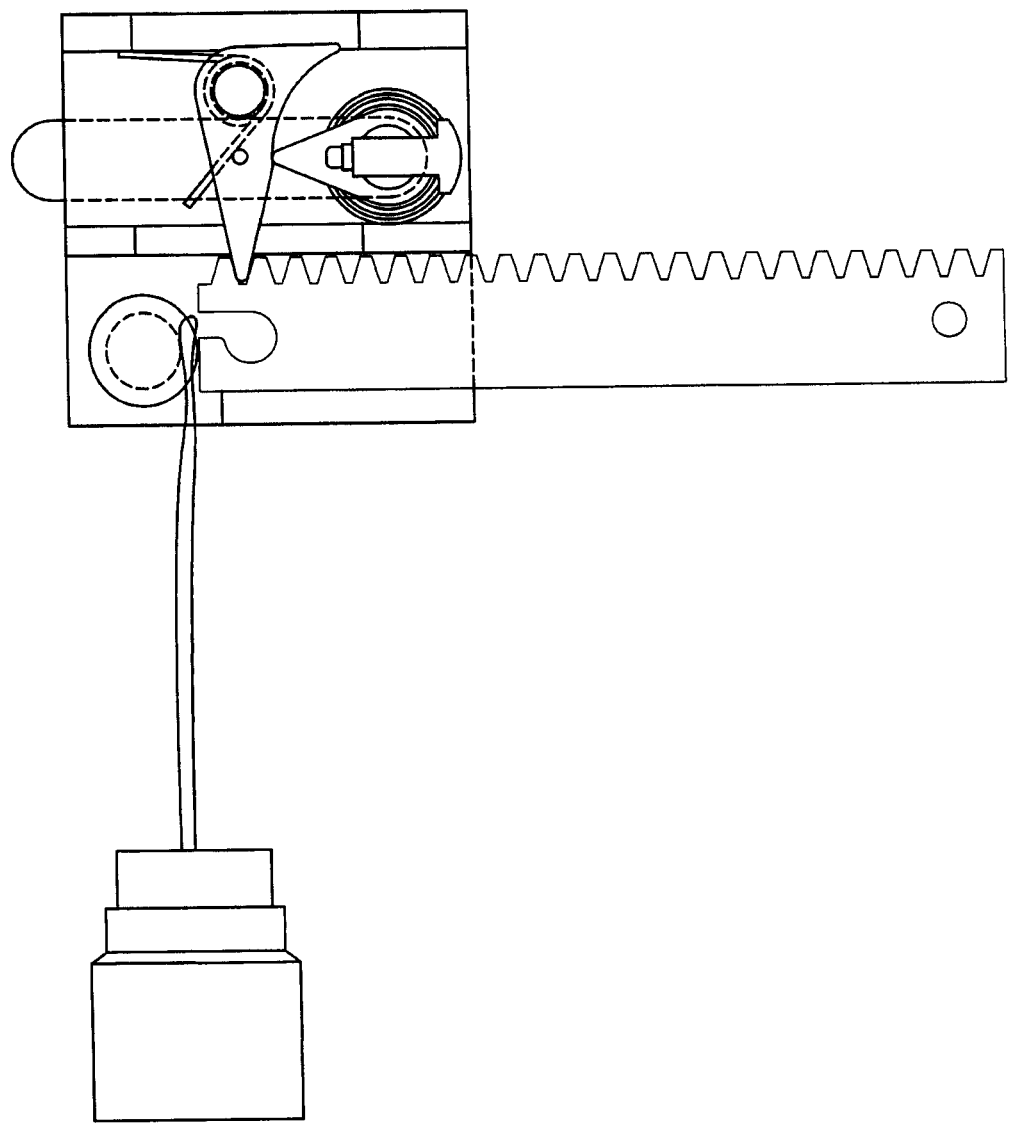
FIG. 8I is a partial sectional view of the cable retractor of FIG. 8H in the locked condition.

FIG. 8G shows the cable retractor 500 in an unlocked condition. After the handle 516 is moved to the unlocked condition, the arm 518 allows the slider 508 to move out of the housing 522. FIG. 8H shows rotation of the pawl 520 to enable the slider 508 to move and extend out of the housing 522 for threading of the lanyard 504 with the holder 502. As shown in FIG. 8I, after extension of the slider 508 for threading, the handle 516 can be moved to the locked position.

The present invention provides methods and apparatus to enhance the survivability and reliability of cables and connectors during the separation of connected items, as well as to secure the just-released free end of the cable to prevent damage to the cable or item holder following release. Exemplary embodiments of the cable retractor include a linear, spring-loaded, movement mechanism that creates a slight pre-tension in the lanyard, eliminating slack. Upon release, the device locks the lanyard in its current position, with the weight of the released item creating the tension necessary to pull the connector away immediately. After release, the spring force continues to pull on the lanyard until the connector is secured against the base of the retractor assembly.

It is understood that a variety of modifications and substitutions will be readily apparent to one of ordinary skill in the art that do not depart from the invention. For example, while hooks are shown to engage the lanyard, it is understood that a variety of other suitable mechanisms can be used.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A cable retractor device, comprises:
   a housing having a longitudinal axis;
   a holder to engage a lanyard for removing a cable connector from an item;
   a movement mechanism coupled to the holder to move the holder along the longitudinal axis;
   a lock mechanism to enable bidirectional or unidirectional movement of the movement mechanism in an unlocked condition and unidirectional movement of the movement mechanism in a locked condition;
   a transition mechanism to transition the lock mechanism between the locked and unlocked conditions; and
   a bias member coupled to the movement mechanism for moving the connector towards the housing when the item is released.

2. The device according to claim 1, wherein the connector is adapted to connect a releasable item secured to a vehicle.

3. The device according to claim 2, wherein the vehicle is an aircraft.

4. The device according to claim 1, wherein the connector conforms to military standard MIL-STD-1760.

5. The device according to claim 1, wherein the holder includes at least one hook.

6. The device according to claim 1, wherein the movement mechanism includes a ratchet mechanism.

7. The device according to claim 1, wherein the movement mechanism includes a slider with teeth.

8. The device according to claim 6, wherein the lock mechanism includes pawls to selectively engage the ratchet teeth.

9. The device according to claim 8, wherein the lock mechanism includes first and second members with at least one bias element biasing the lock mechanism to the locked condition.

10. The device according to claim 9, wherein the first and second members are generally U-shaped.

11. The device according to claim 9, wherein the transition mechanism includes at least one depression in an inner surface of the housing to provide the locked or unlocked condition.

12. The device according to claim 11, wherein the rotation of the housing to position the at least one depression selects a first one of the locked and unlocked conditions.

13. The device according to claim 1, wherein the lock mechanism includes a pawl that can rotate between locked and unlocked states.

14. A method, comprising:
   providing a cable retractor device including a housing having a longitudinal axis;
   providing a holder to engage a lanyard for removing a cable connector from an item, providing a movement mechanism coupled to the holder to move the holder along the longitudinal axis, providing a lock mechanism to enable bidirectional or unidirectional movement of the movement mechanism in an unlocked condition and unidirectional movement of the movement mechanism in a locked condition;

providing a transition mechanism to transition the lock mechanism between the locked and unlocked conditions; and providing a bias member coupled to the movement mechanism for moving the connector towards the housing when the item is released.

15. The method according to claim 14, wherein the connector is adapted to connect a releasable item secured to a vehicle.

16. The method according to claim 15, wherein the vehicle is an aircraft.

17. The method according to claim 14, wherein the connector conforms to military standard MIL-STD-1760.

18. The method according to claim 14, wherein the movement mechanism includes a ratchet mechanism.

19. The method according to claim 14, wherein the movement mechanism includes a slider with teeth.

20. The method according to claim 14, wherein the lock mechanism includes first and second members with at least one bias element biasing the lock mechanism to the locked condition.

21. The method according to claim 14, wherein the transition mechanism includes at least one depression in an inner surface of the housing to provide the locked or unlocked condition.

22. The method according to claim 21, further including rotating the housing to position the at least one depression for selecting a first one of the locked and unlocked conditions.

23. A system, comprising:

an aircraft;

a releasable item secured to the aircraft, the item being coupled to the aircraft via a cable having a connector;

a cable retractor comprising a housing having a longitudinal axis;

a holder to engage a lanyard for removing the cable connector from an item;

a movement mechanism coupled to the holder to move the holder along the longitudinal axis;

a lock mechanism to enable bidirectional or unidirectional movement of the movement mechanism in an unlocked condition and unidirectional movement of the movement mechanism in a locked condition;

a transition mechanism to transition the lock mechanism between the locked and unlocked conditions; and a bias member coupled to the movement mechanism to pull the lanyard into the housing when the lock mechanism is in the locked condition for moving the connector towards the housing when the item is released.

24. The system according to claim 23, wherein the connector conforms to military standard MIL-STD-1760.

25. The system according to claim 23, wherein the movement mechanism includes a ratchet mechanism.

26. The system according to claim 23, wherein the transition mechanism includes at least one depression in an inner surface of the housing the locked or unlocked condition.

27. The system according to claim 23, wherein the rotation of the housing to position the at least one depression selects a first one of the locked and unlocked conditions.

* * * * *